United States Patent
Baumann

[11] 3,805,445
[45] Apr. 23, 1974

[54] SHAFT-STRUCTURE FOR USE IN HYDROPONICS PLANT CULTIVATION RECEPTACLES

[75] Inventor: Gerhard Baumann, Buempliz-Bern, Switzerland

[73] Assignee: Interhydro AG, Berne, Switzerland

[22] Filed: Oct. 17, 1972

[21] Appl. No.: 298,231

[30] Foreign Application Priority Data
Oct. 27, 1971 Switzerland............... 15633/71

[52] U.S. Cl. .................................................. 47/1.2
[51] Int. Cl. .............................................. A01g 31/02
[58] Field of Search ................. 47/1.2, 38–38.1, 47/34

[56] References Cited
UNITED STATES PATENTS
3,483,656  12/1969  Baumann ............................ 47/1.2
3,222,819  12/1965  Marcan .............................. 47/38.1
1,108,334   8/1914  Carr ................................... 47/38.1
3,624,692  11/1971  Lux ..................................... 47/1.2

FOREIGN PATENTS OR APPLICATIONS
291,410  9/1953  Switzerland

Primary Examiner—Robert E. Bagwill
Attorney, Agent, or Firm—Dwight H. Smiley Imirie and Smiley

[57] ABSTRACT

A shaft-structure for use in a hydroponics plant cultivation receptacle containing substrate material and nutrient liquid, having a hollow removable inset container to facilitate removal of when substrate material thrown in an unauthorized manner into the shaft-structure without necessitating emptying of the whole receptacle.

8 Claims, 1 Drawing Figure

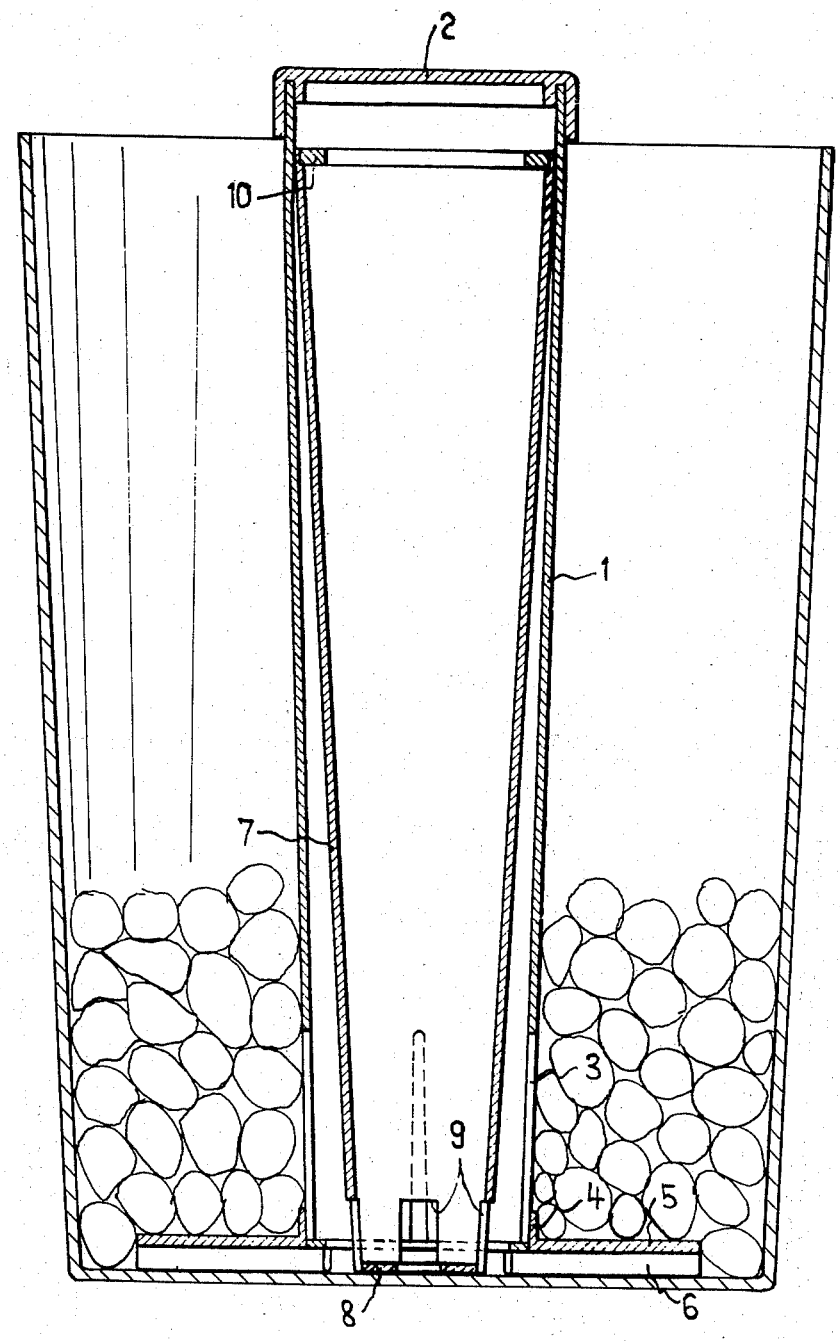

SHAFT-STRUCTURE FOR USE IN HYDROPONICS PLANT CULTIVATION RECEPTACLES

BACKGROUND OF THE INVENTION

1. Field of the Invention

The present invention relates generally to hydroponics receptacles, and more particularly, to a shaft-structure therefor which is easily maintained free of substrate particles.

2. Description of the Prior Art

Hydroponics means plant cultivation without earth, that is a cultivation for the growing of plants with their roots immersed in an aqueous nutrient solution and established in some inert material of substrate, instead of in soil. Such substrate may, for instance, be granules of expanded or bloating clay or vermiculite. The conditions to be observed for hydroponics are very different from those of earth or soil cultivation.

My U.S. Pat. No. 3,483,656 and my corresponding German Pat. No. 1,582,697 and British Pat. No. 1,121,160 illustrate and describe a receptacle for use with hydroponics. Such receptacles have at least one hollow shaft extending from the bottom of the receptacle at least approximately up to the upper edge of the receptacle.

My U.S. Pat. No. 3,483,656 illustrates a receptacle with a hollow shaft forming a pouring-in and sucking-off channel for the nutrient solution, this channel or shaft having a semicircular cross-section and being made in one piece with the wall of the receptacle, and a second hollow shaft loosely arranged in the substrate. This second tubular shaft constitutes a cylindrical container of a nutrient fluid level gage. However, there may also be hydroponics receptacles having only one hollow shaft.

Experience has shown that unauthorized persons, for instance, children find pleasure in taking out substrate granules from the receptacle and to throw them into the hollow shaft, say in the pouring-in channel and/or in the container of the level gage, these shafts being mostly open at the top or closed by an easily removable cover. This throwing-in of substrate granules into the pouring-in shaft has a consequence that nutrient liquid can no longer be sucked-off when the granules reach a certain level in the shaft. Also with the containers for a level gage, which are usually closed at the top by an easily removable cover, it often happens that unauthorized persons remove the cover and throw substrate granules into the containers so that the float in the level gage container can no longer be removed. Another disadvantage of granules in the level gage container is, that the real liquid level is no longer indicated since the float can no longer follow the liquid level, and this level is of utmost importance in hydroponics. Another disadvantage is that, even if the hollow shaft or shafts are independent tubes standing in the substrate, these tubes must be withdrawn from emptying them from the thrown-in granules and so the substrate in the receptacle falls into the hollow space left by the withdrawn tube or tubes so that the receptacle must be completely emptied, i.e., substrate and plants must be removed in order that the emptied tube or tubes can be inserted into the receptacle before filling the latter again with substrate and plants.

SUMMARY OF THE INVENTION

It is an object of this invention to remedy these inconveniences. For this purpose, according to my invention, an inset container loosely inserted into a shaft of the receptacle is provided to capture matter improperly placed in the shaft. The insert is conveniently removable from the shaft through the upper end thereof to enable subsequent removal of such matter without disturbing the contents of the receptacle.

Other objects and features will be apparent as the following description proceeds, reference being had to the accompanying drawing.

BRIEF DESCRIPTION OF THE DRAWING

The single FIGURE is a vertical sectional view of a preferred embodiment of a hydroponics shaft-structure according to the present invention.

DESCRIPTION OF THE PREFERRED EMBODIMENT

The shaft-structure of the present invention may be used with any suitable hydroponics receptacle (not shown) such as that shown and described in my U.S. Pat. No. 3,483,656. The embodiment illustrated in the drawing pertains to a pouring-in and sucking-off shaft for nutrient liquid, which, differing from the corresponding shaft in my U.S. Pat. No. 3,483,656, is not made in one piece with the wall of the plant receptacle, but constitutes an independent tube with a circular cross-section; that is, a structure similar to the level gage container in the example of my above noted U.S. patent. The tube or shaft 1 with the usual slots 3 at the lower end, serving to pass nutrient liquid and also for increasing the oxygen supply to the roots of the plant or plants, is, in this example, closed by a cover 2 which may also easily be removed by children. In many cases there is even no cover. The lower end of the tube or shaft 1 is held in an annular flange or collar 4 of a plate 5 which has, for instance, a square surface. The plate 5 has ribs 6 to support it on the bottom of a receptacle, such as that shown in my U.S. Pat. No. 3,483,656. The plate 5 serves the purpose of preventing unauthorized withdrawal of the tube or shaft 1 from the substrate identified by the reference 7 in my U.S. Pat. No. 3,483,656. For this purpose, the lower end of the tube or shaft 1 is connected with the annular flange or collar 4 either by sufficient static friction or by fixing it to the collar. Such a plate may also be provided if the tube or shaft 1 forms the container of a liquid level gage.

In the tube or shaft 1 there is an inset or elongated container 7 conically tapering towards the bottom. This inset 7 is loosely inserted into the tube or shaft 1 and its generally flat bottom 8 is supported of the bottom of the plant receptacle. At its lower end the inset 7 has openings 9 serving the same purpose as the slots 3 of the tube or shaft 1. At its upper end the inset 7 has an internal flange 10 which, for an easy withdrawal of the inset 7, can be seized along the lower edge of the flange by a finger of the hand, when the inset is to be emptied of substrate granules.

The advantage of the illustrated and described device is clear. If substrate granules are thrown in an unauthorized manner into the shaft-structure, they all fall into the inset 7 because the upper end of the latter butts closely against the inner wall of the tube or shaft 1 or only has such small play with regard to the shaft 1 that no granules can pass between the inset and shaft walls. Should sucking-off of nutrient liquid due to the thrown-in substrate granules no longer be possible, the inset 7 may be easily withdrawn, then emptied and again inserted into the tube or shaft 1.

If the tube or shaft 1 is a liquid level gage container, the inset 7 may be withdrawn from the top together with the gage float. A float and indicator bar as, for instance, shown in my U.S. Pat. No. 3,483,656 are, arranged in the inset 7 and the cover 2 may carry a sight-tube as also shown in my said U.S. patent.

If the inset 7 is given a corresponding cross-section it may, of course, also be used in hollow shafts which are rigidly connected with the plant receptacle wall, e.g., made in one piece with the latter.

The bottom plate 5 may also be used for hollow shafts without a removable inset 7.

While I have illustrated and described one embodiment of my invention, I do not wish to restrict the scope of protection thereto, but reserve the right to make such modifications or rearrangements as may come within the purview of the appended claims.

I claim:

1. Apparatus for hydroponics plant cultivation, comprising a hydroponics receptacle having side walls and a bottom wall attached thereto; a hollow, generally upright shaft disposed in said receptacle and extending upwardly from the bottom wall thereof, said shaft being open at its upper end and defining slots at its lower end for the passage of nutrient liquid; substrate material substantially filling the receptacle and abutting against said shaft; an elongated, hollow container removably disposed within said shaft and having a length generally equal to the length of said shaft, said container constructed so as to pass through the upper end of said shaft and having a bottom wall and an open upper end the peripheral portion of which conforms substantially with the inner dimensions of said shaft such that substrate material inadvertently placed in said shaft will fall into and be received by said container, said container having openings for the passage of liquid and retaining such inadvertently placed substrate material for subsequent removal by withdrawal of said container from said shaft whereby said shaft may be retained in said receptacle to obviate disruption of the contents thereof.

2. Apparatus as claimed in claim 1, further including a bottom plate extending outwardly from the lower portion of said shaft and underlying said substrate disposed on the floor of said receptacle, said hollow shaft being attached at its lower end to said plate and precluding inadvertent removal thereof from said substrate.

3. Apparatus as claimed in claim 2, wherein said bottom plate has an upstanding flange to which said hollow shaft is attached.

4. Apparatus as claimed in claim 1, wherein said hollow shaft is integrally formed with said receptacle.

5. Apparatus as claimed in claim 1, wherein said container tapers downwardly and inwardly towards the bottom wall of the receptacle.

6. Apparatus as claimed in claim 1, wherein the lower end of said container has a generally flat bottom surface adapted to be supported on the bottom of said receptacle.

7. Apparatus as claimed in claim 1, wherein said container has at its upper end an internal flange to be seized along the bottom edge of said flange by a finger for withdrawing said container from said hollow shaft.

8. Apparatus for use in a hydroponics plant cultivation receptacle containing substrate granules and nutrient liquid, comprising a hollow shaft open at its upper end and defining slots at its lower end for the passage of nutrient liquid, a generally flat bottom plate having a plurality of downwardly protruding support ribs and an upwardly protruding annular flange to which the bottom of said hollow shaft is attached, a hollow elongated container removably disposed within said shaft and having a length generally equal to the length of said shaft, said container constructed so as to pass through the upper end of said shaft and having an open upper end the peripheral portion of which conforms substantially with the inner dimensions of said shaft, said container tapering downwardly and inwardly with respect to said shaft and defining slots at its lower end for the passage of nutrient liquid, and an internal flange at the upper end of said container to facilitate removal of said container from said shaft.

* * * * *